(12) United States Patent
Radermacher

(10) Patent No.: US 8,664,892 B2
(45) Date of Patent: Mar. 4, 2014

(54) LIGHT EMITTING DIODE SYSTEM

(75) Inventor: Harald Josef Gunther Radermacher, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 574 days.

(21) Appl. No.: 12/990,516

(22) PCT Filed: Apr. 29, 2009

(86) PCT No.: PCT/IB2009/051745
§ 371 (c)(1),
(2), (4) Date: Nov. 1, 2010

(87) PCT Pub. No.: WO2009/136322
PCT Pub. Date: Nov. 12, 2009

(65) Prior Publication Data
US 2011/0043136 A1    Feb. 24, 2011

(30) Foreign Application Priority Data
May 5, 2008    (EP) .................................... 08103824

(51) Int. Cl.
*H05B 37/02* (2006.01)
(52) U.S. Cl.
USPC ............ 315/307; 315/224; 315/291; 315/308
(58) Field of Classification Search
USPC ............ 315/294, 244, 291, 308, 307, 74, 246
See application file for complete search history.

(56) References Cited

U.S. PATENT DOCUMENTS

| | | | |
|---|---|---|---|
| 6,570,505 B1 | 5/2003 | Malenfant | |
| 6,860,628 B2 * | 3/2005 | Robertson et al. | 362/555 |
| 6,936,968 B2 | 8/2005 | Cross et al. | |
| 7,067,992 B2 * | 6/2006 | Leong et al. | 315/291 |
| 7,911,149 B2 * | 3/2011 | Schaible et al. | 315/224 |
| 2006/0193131 A1 | 8/2006 | McGrath et al. | |
| 2007/0223225 A1 | 9/2007 | Eiich et al. | |
| 2009/0026973 A1 * | 1/2009 | Kato et al. | 315/201 |
| 2009/0150004 A1 * | 6/2009 | Wang et al. | 700/286 |

FOREIGN PATENT DOCUMENTS

| | | |
|---|---|---|
| DE | 202006006417 | 11/2006 |
| EP | 1316243 B1 | 6/2003 |
| EP | 1578171 A1 | 9/2005 |
| EP | 1860370 A1 | 11/2007 |
| WO | 0139553 A1 | 5/2001 |
| WO | 2007092003 A1 | 8/2007 |
| WO | 2008136458 A1 | 11/2008 |

* cited by examiner

*Primary Examiner* — Douglas W Owens
*Assistant Examiner* — Amy Yang
(74) *Attorney, Agent, or Firm* — Kenneth Springer; Mark Beloborodov

(57) ABSTRACT

The invention relates to a light emitting system (100), the system comprising a light emitting diode (104), a socket adapter for retrofitting a fluorescent lamp and an electric circuit (112; 200; 306), the electric circuit (112; 200; 306) being adapted for emulating the presence of a fluorescent lamp to a fluorescent lamp driver (102).

20 Claims, 4 Drawing Sheets

LIGHT EMITTING DIODE SYSTEM

FIELD OF THE INVENTION

The invention relates to a light emitting system and a lamp driver for a light emitting system.

BACKGROUND OF THE INVENTION

Light emitting diodes (LEDs) will play an increasingly significant role in general lighting in the future. This will result in more and more new installations being equipped with LED light sources in various ways. The reason for replacing state of the art light sources with LED light sources is the low power consumption of LED light sources and their extremely long lifetime.

Further, compared to the lifetime of for example fluorescent type light sources, the lifetime of respective housings for receiving the fluorescent type light sources and the respective drivers for powering the fluorescent type light sources is rather long. Thus, it seems to be attractive if a user could simply replace such kind of fluorescent type light sources.

However, there is the problem that modern electronic ballasts or drivers have identification capabilities of fluorescent light sources like "TL-tubes", i.e. they measure for example the filaments resistance in order to detect the type of TL-tube connected to the ballast. Such a measurement of a filament resistance is advantageous since typically different tube types require different driving power requirements. For example, the length of a TL-tube influences the burning voltage of the tube and hence the power level. In case an LED retrofit tube is connected to such an intelligent tube driver, due to the presence of LEDs and not simple TL-tube filaments the tube driver might detect a strange filament resistance and hence quit operation.

U.S. Pat. No. 6,936,968 discloses an LED light tube for replacement of fluorescent light tubes including an elongated cylindrical transparent envelope, a base cap at each end of the envelope and at least one LED device in electrical communication with the base cap. The LED light tube is adapted for use in so called troffer-type light fixtures.

SUMMARY OF THE INVENTION

It is an object of the present invention to provide a light-emitting system able to be powered by any modern electronic ballast or driver.

This object is solved by a light emitting system, the system comprising a light emitting diode, a socket adaptor for retrofitting a fluorescent lamp and an electric circuit, the electric circuit being adapted for emulating the presence of the fluorescent lamp to a fluorescent lamp driver.

The light emitting system according to the invention has the advantage, that any modern electronic ballasts or drivers will be able to power the LED retrofit tube since the driver will always sense the presence of a 'normal' fluorescent TL-tube. Since thus, the driver will assume the presence of a state of the art TL-tube, the driver will power the LED retrofitting lamp in a stable manner.

With the increase of LED efficiency, a constant drive power would result in increasing brightness when using the newest, high efficient LEDs compared to an initial configuration. The light emitting system according to the invention thus has further the advantage, that a certain optical flux per fixture can be provided independently of the LED used by emulating the presence of a certain fluorescent lamp characteristics to the fluorescent lamp driver.

Further, with LED lighting, there are lots of other possibilities, for example using different colored LEDs to have a tunable color or to use white LEDs with different color temperatures. In all these cases, by tuning the response of the electric circuit different driving power schemes can be requested from the fluorescent lamp driver which will always allow to adapt the light emitted by the light emitting diodes in a desired manner. In other words, in all these cases some information about the features of a light emitting diode retrofitted tube is communicated to the driver, either to guarantee stable operation in case simulating the presence of a traditional fluorescent tube or to use the features of an LED tube with a dedicated driver.

For example, to set a correct light output, the drive current could be adjusted to state of the art LEDs. Even with the long technical lifetime of LEDs, due to increasing energy costs, the replacement of an LED tube with an even more efficient LED tube (due to increased lm/W of the LEDs) is quite reasonable. In such a scenario it is good to adapt the driver to the requirements of the new LED tube automatically. This guarantees to have the same amount of light produced per luminaire. The only difference is that the lamp consumes less power. Assuming a current source behavior, this can be accomplished by lowering the forward voltage of the LED tube. As a result, the number of LEDs per tube would have to be changed which can result in optical problems due to the discreet light points, producing a more non-diffused light. A better solution is therefore to use the same amount of LEDs, but smaller LED chips which produce the same light output with a lower current.

In accordance with an embodiment of the invention, the electric circuit is adapted for emulating the presence of the fluorescent lamp by emulating a fluorescent lamp filament resistance and/or a fluorescent lamp impedance to the fluorescent lamp driver. The advantage of emulating a fluorescent lamp filament resistance and/or a fluorescent lamp impedance to the fluorescent lamp driver is, that electronic lamp drivers will automatically assume the presence of a standard fluorescent TL-tube and thus provide electric power to the light emitting system which is sufficient to operate the light emitting system. Since modern electronic ballasts are able to identify power requirements of TL-tubes depending on the fluorescent lamp filament resistance and/or the fluorescent lamp impedance, by emulating a certain predetermined fluorescent lamp filament resistance and/or fluorescent lamp impedance to the fluorescent lamp driver the fluorescent lamp driver can be controlled to provide electric power in a very specific manner to the light emitting system. For example, a certain emulated filament resistance will correspond to certain power requirement characteristics of a certain TL-tube which in consequence will control the fluorescent lamp driver to provide a certain driving power scheme to the light emitting system. Such a driving power scheme may comprise certain driving voltages for example during a fluorescent lamp starting sequence, certain current schemes, driving frequencies, current waveforms etc.

In accordance with an embodiment of the invention, the electric circuit is adapted to emulate the fluorescent lamp impedance in a frequency range unused in fluorescent lamp operation procedures. Such an emulation of a fluorescent lamp impedance in a frequency range unused in fluorescent lamp operation procedures has the advantage, that for example additionally light emitting diode specific information can be provided to the fluorescent lamp driver by means of characteristic impedance responses in such an unused frequency range. For example, the light emitting system can emulate the presence of a standard fluorescent lamp by means of a fluorescent lamp impedance in a frequency range used in state of the art for fluorescent TL-lamp operation procedures, and additionally a further fluorescent lamp impedance in a frequency range unused in fluorescent lamp operation procedures. Low end fluorescent lamp drivers will only scan the frequency range typically used in state of the art fluorescent lamp operation procedures and thus just assume the presence of 'normal' fluorescent lamp. However, high end fluorescent lamp drivers will be additionally able to scan the frequency range unused in standard fluorescent lamp operation procedures and detect the presence of certain characteristic impedances in this frequency range. The detected impedance can be analyzed and since it is characteristic for a respective light emitting system comprising a retrofitting LED tube, the high end fluorescent lamp driver will be able to provide a respectively adapted power scheme to the light emitting system.

In accordance with an embodiment of the invention, the electric circuit is further adapted to draw nominal power from the fluorescent lamp driver at a fluorescent lamp starting process, the nominal power being sufficient to power the light emitting diode for light emission. For this purpose, the electric circuit may for example be adapted to detect a fluorescent lamp starting process based on the frequency of the fluorescent lamp driving current supplied by the driver. In this case, the emulation can be performed in such a manner that the fluorescent lamp driver assumes an extremely fast completion of the preheating procedure required for state of the art fluorescent tubes comprising respective heating filaments. Thus, by 'switching on' the light emitting system, the light emitting system will provide a stable light output already within a very short period of time, much shorter than the time period typically required for powering up state of the art fluorescent lamps.

In accordance with an embodiment of the invention, the electric circuit is adapted to detect the fluorescent lamp driver status based on the frequency of the fluorescent lamp driving current supplied by the driver. It may further be adapted to detect a fluorescent lamp driver characteristic. This includes for example the driving power, preheating and starting procedures, operating procedures based on the frequency of the fluorescent lamp driving current supplied by the driver etc. Detecting the fluorescent lamp driver characteristics and/or status has the advantage, that for example as already mentioned above the starting procedure of a light emitting system, i.e. the power up procedure after having switched on the system, can be speed up in time compared to state of the art fluorescent lamp systems.

In accordance with an embodiment of the invention, the electric circuit is adapted for powering a set of light emitting diodes, wherein a subset of the set of light emitting diodes is powered for light emission by the electric circuit, wherein the electric circuit is further adapted for distributing the power delivered from the fluorescent lamp driver to the subsets of light emitting diodes based on the characteristics of the delivered power. Preferably, the electric circuit is a passive circuit. For example, the electric circuit may comprise a set of circuits which will take up power only in predetermined frequency ranges, i.e. the circuits are band pass filters, low pass filters etc. Since for example during the starting procedure of a state of the art fluorescent lamp, a high frequency current is provided from the fluorescent lamp driver, this frequency can be used to selected a subset of light emitting diodes to be powered for light emission already during said standard starting procedure carried out by the fluorescent lamp driver. After the starting procedure has been completed, the fluorescent lamp driver will reduce the supplied current frequency and additionally will provide enough power to power up all light emitting diodes in the light emitting system. Preferably, the electric circuits connecting the up to now unused other subsets of light emitting diodes with the fluorescent lamp driver are able to take up power in the 'normal operation procedure' frequency range now used by the fluorescent lamp driver and thus power up the until now unused light emitting diodes. As a consequence, during the normal fluorescent lamp starting procedure already a subset of light emitting diodes will emit light such that the response time of the light emitting system for providing any light at all during the fluorescent lamp starting procedure can be effectively minimized.

A further advantage of having an electric circuit which is adapted for powering a subset of the set of light emitting diodes is, that different color temperatures by powering different light emitting diodes can be effectively generated and switched. The same holds for the most simple application which is controlling the number of powered light emitting diodes and thus the amount of light produced by the lamp. In other words, by emulating a certain fluorescent lamp filament resistance and/or a fluorescent lamp impedance characteristic to the fluorescent lamp driver, it is possible to 'motivate' and control the fluorescent lamp driver to supply electric power in a certain frequency range such that a certain subset of light emitting diodes will be powered in a predetermined manner.

This is especially advantageous in combination with additional sensing elements comprised in the light emitting system. For example, these sensing elements may comprise means for detecting light emitting system characteristics, wherein said light emitting system characteristics comprise the actual light emission characteristics and/or temperature of the light emitting system and/or environmental conditions of the environment in which the light emitting system is operated and/or the age of the light emitting system. For example, after having detected a certain light emitting system characteristica, the light emitting system may change the presently used fluorescent lamp emulation characteristica in such a manner, that the fluorescent lamp driver is controlled and motivated to change its power supply characteristica in a predefined manner. For example, in case the detected light emitting system characteristics comprise sensed ambient light conditions, the fluorescent lamp driver can be accordingly to said sensed ambient light conditions controlled by changing the light emitting system's impedance. For example in case the light emitting system senses bright daylight the emulation can be performed in such a manner that only a minimal current is supplied by the fluorescent lamp driver to the light emitting system, since obviously a high level of additional light emission from the light emitting system is not required. In contrast, in case the ambient light detection means senses darkness, the emulation by the electric circuit of the light emitting system is performed such as to control the fluorescent lamp driver to provide electric power in such a manner, that all light emitting diodes can be powered for a bright light emission.

Another example for use of a communication of light emitting system features to the fluorescent lamp driver is due to a variation compensation. The tube notices the actual light flux. In case the actual light flux does no longer match a designated value, this is communicated to the driver in order to adjust drive current. Reason for flux variation might be aging or temperature changes. Simple solutions would include a resistor with dedicated temperature dependency (a PTC, NTC) or a light dependent resistor (LDR).

In accordance with an embodiment of the invention, the electric circuit is adapted to perform the emulation for signaling the fluorescent lamp driver a required predetermined power requirement of the light emitting diode. This has the advantage, that for example the above mentioned detected light emitting system characteristics can be used as control input for determining a power requirement of the light emitting system such that in turn the light emitting system is able to signal this required power by performing said certain emulation to the fluorescent lamp driver for receiving the required power.

In accordance with an embodiment of the invention, the electric circuit is adapted for sending a signal indicating a light emitting diode driving power requirement to the fluorescent lamp driver. In other words, instead of only performing an emulation for signaling the fluorescent lamp driver a required predetermined power requirement additionally or alternatively a certain signal is sent to the fluorescent lamp driver, which in turn can be analyzed by the fluorescent lamp driver and control the fluorescent lamp driver to supply the requested power to the light emitting system. Again, the light emitting diode driving power requirement may depend on the above discussed detected light emitting system characteristics.

In accordance with an embodiment of the invention, the signal indicating the light emitting diode driving power requirement is a digital signal.

In accordance with a further embodiment of the invention, the light emitting system further comprises means for receiving remote control signals. Including the means for receiving remote control signals into the light emitting system itself has the advantage, that due to the open design of the light emitting system for light emission electromagnetic waves and/or acoustic waves as remote control signals can reach the means for receiving the remote control signals in an unperturbated manner. In case such means for receiving remote control signals would be included into the fluorescent lamp driver, due to a typical encapsulation of the fluorescent lamp driver in a metallic support remote control signals would be shielded from a respective sensor located in the fluorescent lamp driver. Thus, by including such a sensor for receiving remote control signals into the light emitting system itself, an unwanted shielding of remote control signals can be prevented. Such remote control signals may comprise for example signals for changing the light emission characteristics of the light emitting system, like for example color temperature, light intensity, spatial distribution of the light, power on and off etc.

In general, the electric circuit is adapted to perform the emulation for signaling the lamp driver a required predetermined power requirement such as power level, amplitude of voltage and/or current, frequency, polarity etc, specifying the power to be supplied to the light emitting system. The actual light emission characteristics may comprise a light flux, light temperature, light color, spatial distribution of the light, spectral composition of the light etc.

In another aspect, the invention relates to a fluorescent lamp driver, the lamp driver being adapted to power a fluorescent lamp and a retrofitting light emitting diode system according to the invention. Further, the lamp driver is adapted for detecting the light emitting diode system power requirements. For example, the driver is adapted to perform the detection of the light emitting diode system power requirements based on the resistance and/or impedance response of the light emitting diode system.

In accordance with an embodiment of the invention, the driver is adapted to perform the said detection of the light emitting diode system power requirements based on digital signals received from the light emitting diode system.

In accordance with an embodiment of the invention, the lamp driver further comprises means for receiving from the light emitting diode systems remote control signals which were previously received by the light emitting diode system itself.

BRIEF DESCRIPTION OF THE DRAWINGS

In the following preferred embodiments of the invention are described in greater detail by way of example only making reference to the drawings in which.

DETAILED DESCRIPTION OF EMBODIMENTS

Figure 1:
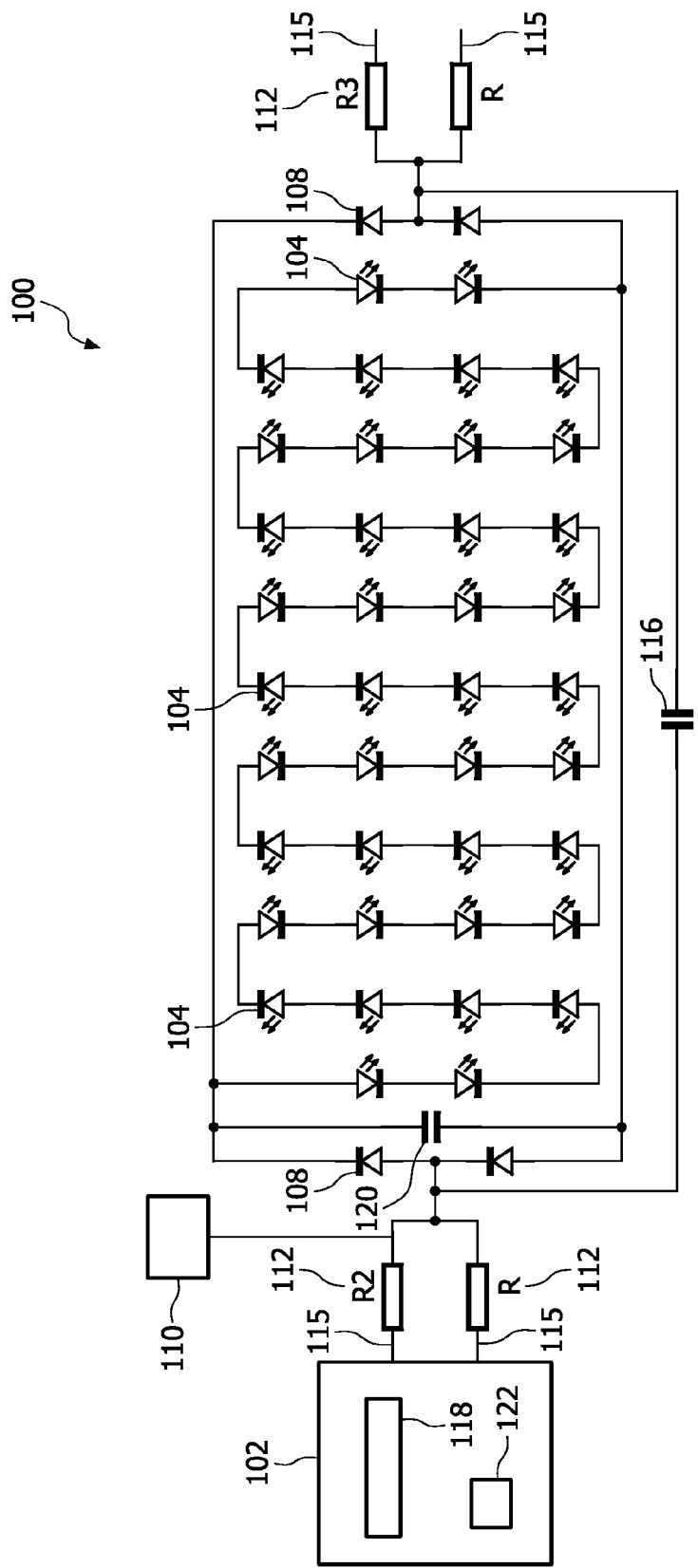
FIG. 1 is a schematic illustrating a light emitting system and a fluorescent lamp driver according to the invention.

FIG. 1 is a schematic illustrating a light emitting system 100 according to the invention. The light emitting system comprises a set of serially connected light emitting diodes 104. When retrofitting fluorescent tubes, there are usually four base prongs 115 resent at the tube, two on each side. Traditionally, the two pins on a base cap are used to power the filament. Since in LED tubes no filaments are required electronic components like resistors 112 which are connected to respective base prongs 115 are used to emulate for example the presence of a certain fluorescent lamp filament resistance and/or fluorescent lamp impedance to the fluorescent lamp driver 102. The capacitor 116 being located in between the two sets of base prongs 115 may be an interference suppression capacitor or might be designed to influence the impedance of the tube in the frequency range used by the driver to power the lamp.

As can be seen from FIG. 1, the two base prongs 115 are connected to the fluorescent lamp driver 102. The fluorescent lamp driver 102 comprises means 118 for detecting for example a fluorescent lamp filament resistance and/or a fluorescent lamp impedance of the light emitting system 100. In the simplest scenario, for operation of the light emitting system 100 the light emitting system 100 emulates a certain fluorescent lamp filament resistance and/or a certain fluorescent lamp impedance by means of the electronic circuit 112 to the fluorescent lamp driver 102. The detection means 118 will detect this emulated alleged fluorescent lamp characteristica and assume the presence of a standard state of the art fluorescent lamp connected to the base prongs 115. Thereupon, the fluorescent lamp driver 112 will send an electric current through the base prongs 115 to the light emitting system 100, wherein the powering of the light emitting system 100 is performed by the fluorescent lamp driver 102 in a manner adapted to the emulated and reported fluorescent lamp filament resistance and/or fluorescent lamp impedance. In other words, the electric circuit 112 presents a substitute circuit to the fluorescent lamp driver 102.

Figure 2:
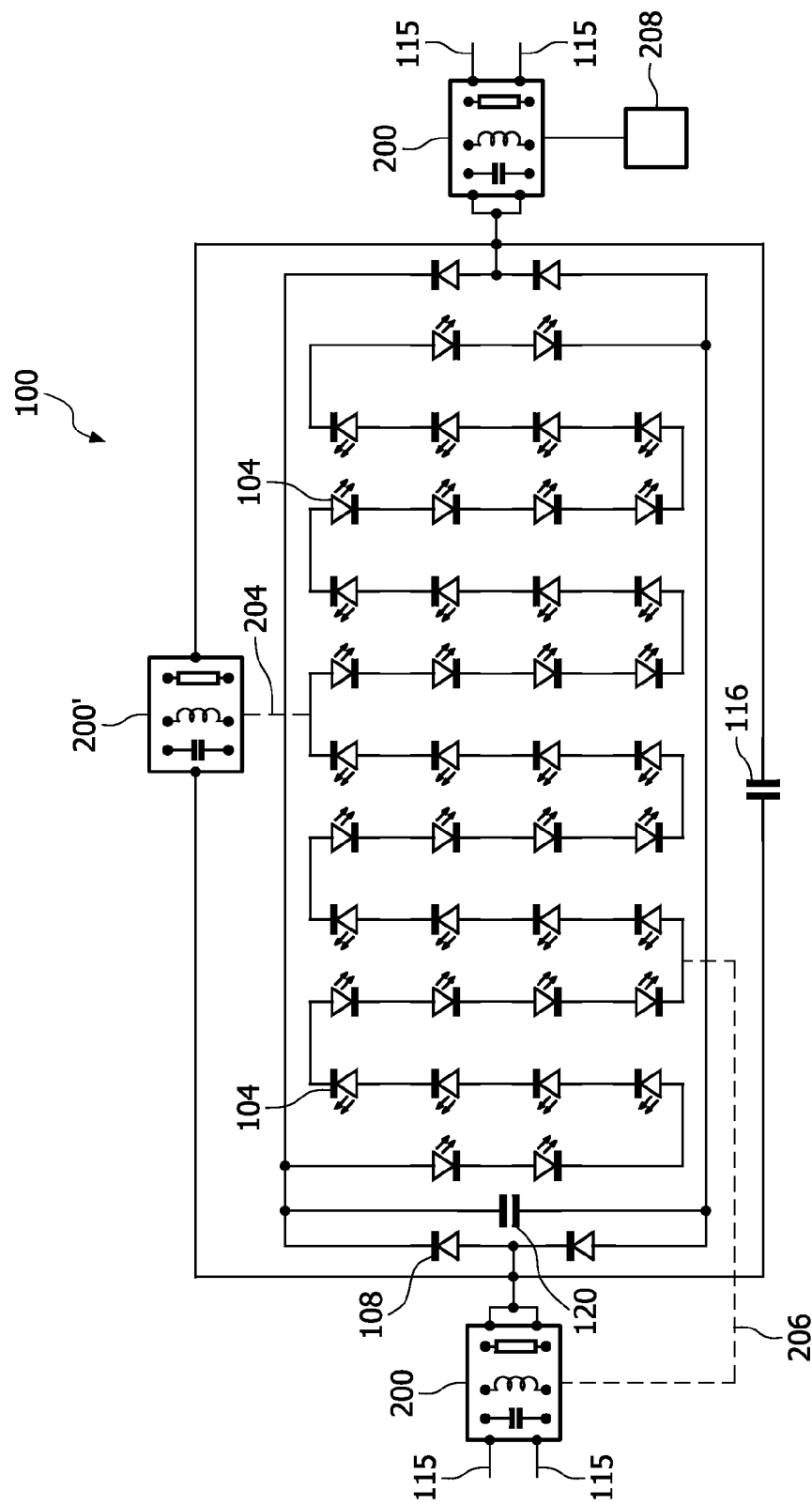
FIG. 2 is a further schematic illustrating a light emitting system according to the invention.

FIG. 2 presents a more highly sophisticated light emitting system 100 in which the electronic circuit 112 of FIG. 1 has been replaced by a set of electronic circuits 200 which may comprise capacitors, coils, resistors and even active electronic components including microprocessors etc. Not shown here is the fluorescent lamp driver 102 which would be again connected to the base prongs 115. In operation, the electronic circuits 200 will again emulate a certain electronic fluorescent lamp response to the fluorescent lamp driver 102. However, since the light emitting system of FIG. 2 is a more highly sophisticated light emitting system, the electric circuit 200 may be adapted to emulate a certain fluorescent lamp impedance in a frequency range usually used in fluorescent lamp operation procedures, and additionally emulating a second predefined impedance to the fluorescent lamp driver in a frequency range normally unused in fluorescent lamp operation procedures. In the latter case, if the fluorescent lamp driver 102 is a respectively adapted fluorescent lamp driver which is additionally able to scan a fluorescent lamp impedance responses in frequency ranges unused in fluorescent lamp operation procedures, the highly sophisticated fluorescent lamp driver 102 will detect the presence of such a very well defined impedance response in said frequency range unused in normal fluorescent lamp operation procedures.

In a practical example, the electric circuit 200 may comprise a resonant circuit operating in a frequency range of 1.5 MHz, which is far away from typically used frequency ranges of standard fluorescent lamps in the range of 50 kHz. The emulated impedance of the electric circuit 200 at 1.5 MHz can be detected by the fluorescent lamp driver 102 which in turn compares the measured impedance at 1.5 MHz with respective impedance reference values stored in a memory 122 of the fluorescent lamp driver 102. Each impedance reference value is associated a respective power scheme of the fluorescent lamp driver 102 which after having measured the respective impedance will be used to supply electric power to the light emitting system 100. For example, if the light emitting system 100 comprises a large amount of light emitting diodes, the light emitting system 100 will emulate a respective impedance to the fluorescent lamp driver which is associated in the table comprised in the memory 122 to a power scheme of the fluorescent lamp driver which includes high currents and/or voltages which are thus sufficient to power said large amount of light emitting diodes 104. In contrast, if only a few light emitting diodes 104 are present in the light emitting system 100, the light emitting system 100 will emulate with the electric circuit 200 a different impedance to the fluorescent lamp driver 102, wherein the emulated impedance corresponds to a respective power scheme which comprises providing of only low electric currents and voltages via the base prongs 115 to the light emitting system 100.

Also shown in FIG. 2 are connection lines 204 and 206 which connect different parts of the serially interconnected light emitting diodes 104 to different electric circuits 200. In this case, the electric circuits 200 may further comprise frequency responsive elements like for example frequency depending filters like band pass, high pass or low pass filters or active electronics like a μC or switches. In this case, for example the electric circuit 200' may comprise a high pass filter which will permit the provision of electric power via the connection line 204 only above a certain cut off frequency. For example, in case the environmental ambient light detector 208 detects the presence of bright daylight, the electric circuits 200 may be tuned to an impedance which will signal an intelligent fluorescent lamp driver 102 to provide power at a certain frequency which is below the above mentioned cut off frequency, such that the electric circuit 200 will not provide electric power via the conduction line 204 to the light emitting diodes 104. In contrast, in case the ambient light sensor 208 detects the presence of darkness, more light intensity may be requested from the light emitting system 100. In this case, the electric circuits 200 may be tuned to emulate the presence of a different fluorescent lamp impedance to the fluorescent lamp driver 102, which in turn will adapt its power scheme to provide electric power via the base prongs 115 to the light emitting system 100 at a frequency above the above mentioned cut off frequency. In this case, since the electric circuit 200' comprises a high pass filter electric current will be additionally supplied via the connection line 204 to the light emitting diodes 104. The same principle holds with respect to the left electric circuit 200 which may additionally comprise filters which allow the provision of electric power via the connection line 206 to the light emitting diodes 104.

Figure 3:
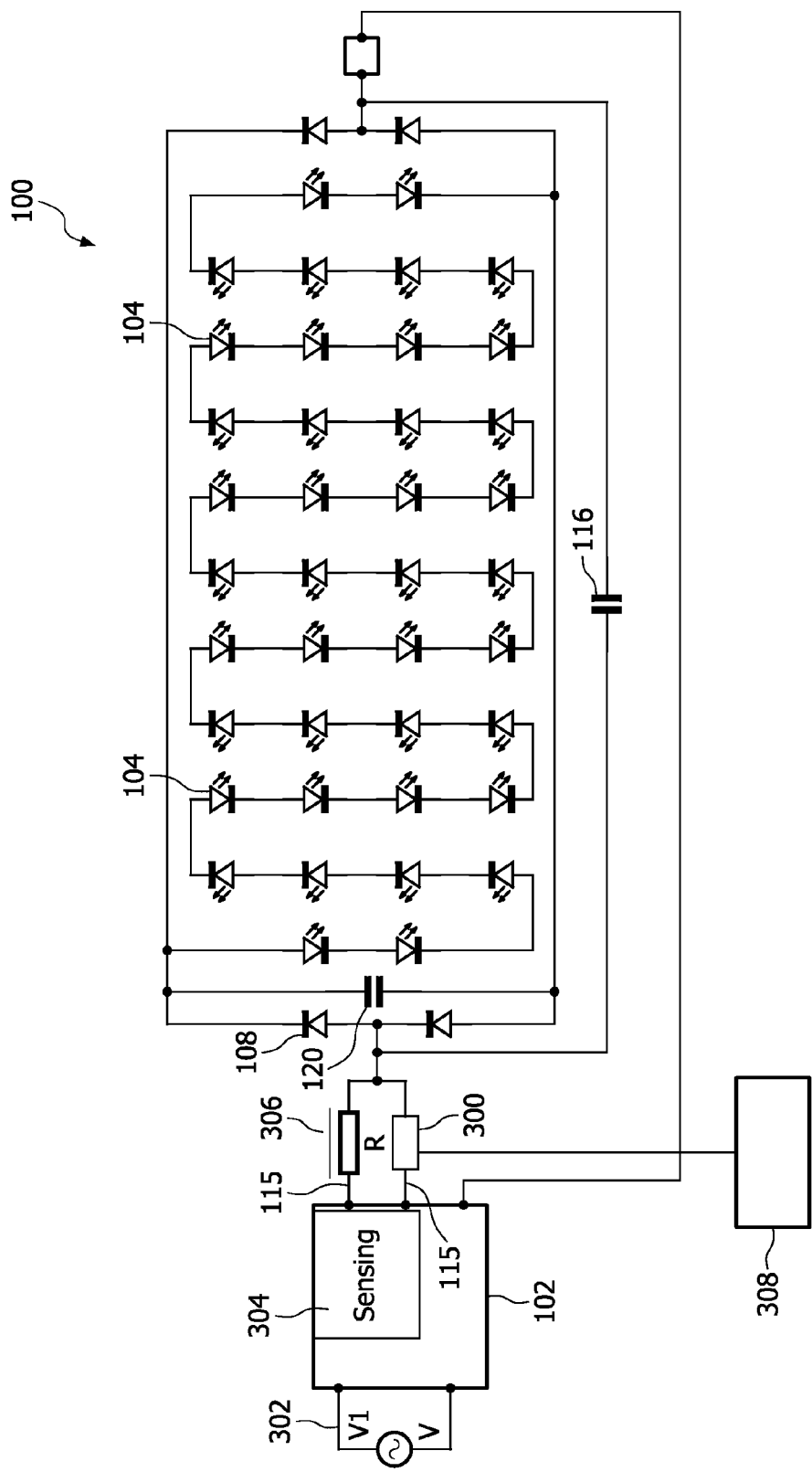
FIG. 3 is a further schematic illustrating a digital light emitting system and a respective digital lamp driver.

FIG. 3 shows a further schematic illustrating a light emitting system 100 and a fluorescent lamp driver 102. Further shown in FIG. 3 is the power supply 302 which supplies line voltage to the fluorescent lamp driver 102. The fluorescent lamp driver 102 further comprises a sensing unit 304 adapted for detection of fluorescent lamp impedances for example emulated by means of an electric circuit 306 of the light emitting system 100 and/or for receiving digital signals from the electric circuit 306. For example, the electric circuit 306 may emulate a certain fluorescent lamp filament resistance and/or fluorescent lamp impedance to the fluorescent lamp driver 102 which is static and always remains unchanged. However, additionally the electric circuit 306 may comprise a microprocessor adapted to provide additional digital signals indicating power requirements of the light emitting system 100 to the fluorescent lamp driver 102. The fluorescent lamp driver 102 will receive and understand the digital signals and in turn adapt its power scheme provided to the light emitting system 100.

For example, the light emitting system 100 comprises detection means for detecting the temperature of the light emitting system 100. These detection means 300 either signals the detected parameter directly to the driver or it might also signal the actual temperature to the electric circuit 306 which in turn may send a digital signal to the fluorescent lamp driver 102 indicating to change the supplied power scheme in order for example to reduce the actual temperature of the light emitting system 100 in order to prevent damages due to overheating etc. However, it has to be pointed out here that the fluorescent lamp driver 102 does not have to necessarily change its provided power scheme upon receiving of any kinds of signals from the light emitting system 100: for example, the light emitting system 100 may just signal the power on hours to the fluorescent lamp driver, which in turn may be queried by an external maintenance system to report the power on hours. This allows for example an operator of a large queried set of light emitting systems 100 to selectively replace light emitting systems 100 after a maximum amount of power on hours has been reached. This will allow a replacement of light emitting systems in time before a regular failure is expected.

Further shown in FIG. 3 is a receiver 308 which comprises means for receiving remote control signals. For example, an operator of the light emitting system 100 may have a remote control which is adapted for sending electromagnetic signals like infrared signals or radio signals to the light emitting system for turning on or turning off the light emitting system. Any other kind of operation scheme may be included to control the operation of the light emitting system 100, which includes controlling the light flux, light temperature, spatial distribution of the light, spectral composition of the light etc. In case a remote control signal is received by the receiver 308, for example either the impedance of the electric circuit 306 is changed accordingly or a digital signal may be provided to the fluorescent lamp driver 102 which in turn will adapt its driving power scheme.

Figure 4:
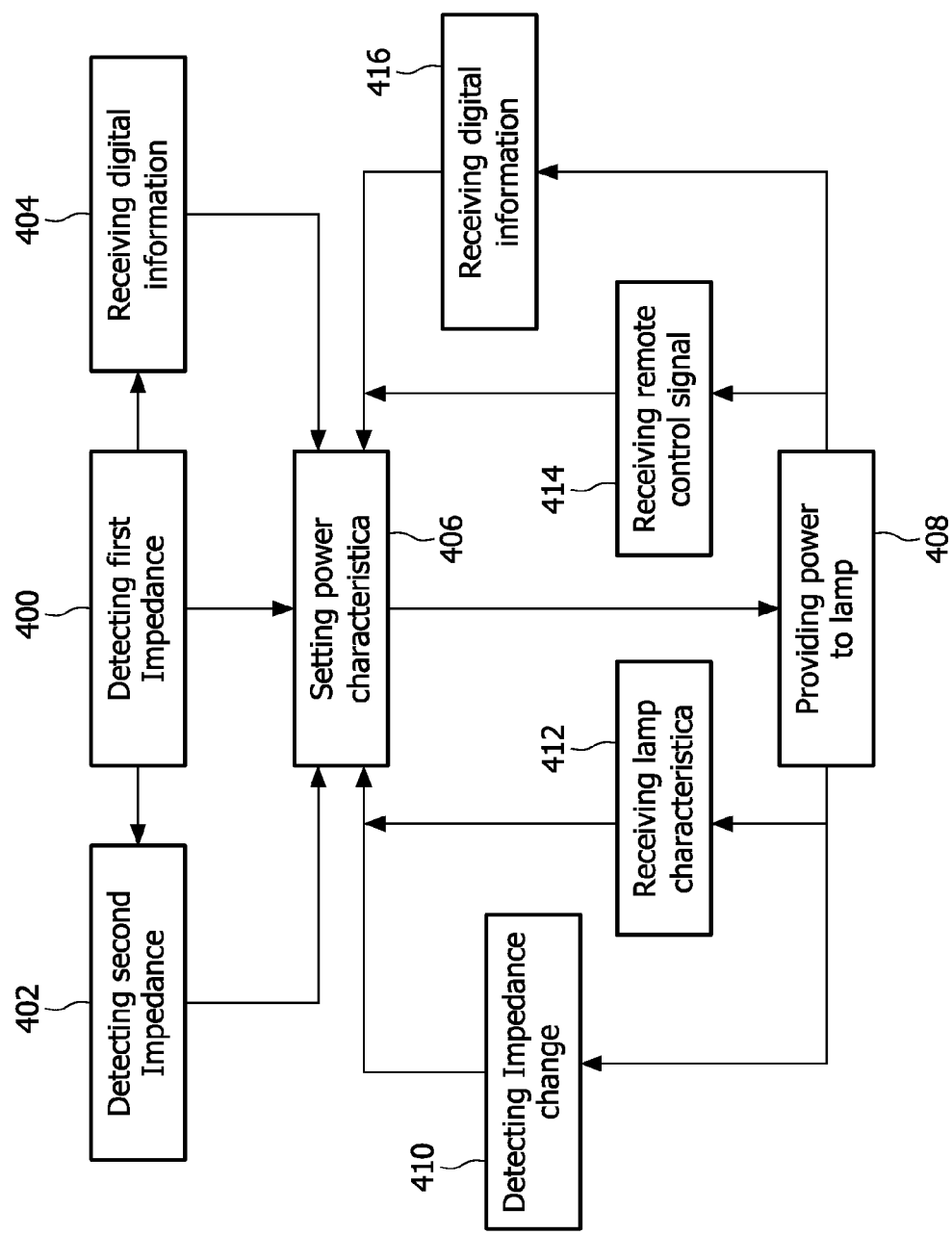
FIG. 4 is a flowchart illustrating a method of operating a light emitting system according to the invention.

Summarized in FIG. 4 are the possibilities how power characteristica for a light emitting system can be changed. The flowchart of FIG. 4 starts with step 400 in which a fluorescent lamp driver detects a first impedance which may be emulated by a light emitting system, the emulation being adapted to emulate for example the presence of a fluorescent lamp filament resistance and/or a fluorescent lamp impedance to the fluorescent lamp driver. Additionally, digital information may be received by the fluorescent lamp driver in step 404 and/or a second impedance may be detected by the fluorescent lamp driver in step 402. Preferably, the second impedance is detected in a frequency range unused in normal fluorescent lamp operation procedures.

Either after any of the steps 400, 402 or 404, the fluorescent lamp driver sets in step 406 a certain power characteristica adapted specifically to the information obtained in any of the steps 400-404. After step 406, step 408 is carried out which is the provision of power to the light emitting system.

During operation of the light emitting system in step 408, the fluorescent lamp driver maybe additionally detect for example in step 410 an impedance change. This will call again step 406 in which power characteristica of the power provided to the light emitting system may be changed, according to the detected impedance chance. In turn in step 408 again power is provided with said changed power characteristica to the light emitting system. Alternatively or additionally to step 410, in step 412 certain lamp characteristica like the actual light flux, lamp temperature, the operation hours of the light emitting system, the actual light color etc may be received by the fluorescent lamp driver. In turn, the fluorescent lamp driver may or may not change the actual power characteristica in step 406. Receiving the lamp characteristica in step 412 will thus not necessarily change the power characteristica settings in step 406 but may also just be used by the fluorescent lamp driver in order to collect further information of the light emitting system for later on provision to an external maintenance system. Additionally or alternatively to step 412 in step 414 remote control signals may be received by the fluorescent lamp driver via a receiver which is built into the light emitting system itself. Again, the remote control signals received in step 414 may lead to a change of the power characteristica settings.

In accordance with another embodiment of the invention, digital information may be received in step 416 which may also lead or not lead to a change of the power characteristica settings in step 406, in accordance with the principles already discussed with respect to step 412.

It has to be pointed out, that emulating a certain filament resistance and/or impedance response to the fluorescent lamp driver is not the only possibility to provide the fluorescent lamp driver information about a requested LED driving power scheme. In general, any kind of electrical response can be emulated to the fluorescent lamp driver, such as resistance, impedance, energy absorption at certain frequencies, resonances etc.

Reference Numerals
   100 light emitting system
   102 fluorescent lamp driver
   104 light emitting diode
   108 rectifier
   110 sensor
   112 electric circuit
   115 base prongs
   116 capacitor
   118 detection means
   120 capacitor
   122 memory
   200 electric circuit
   204 connection line
   206 connection line
   208 sensor
   300 detection means
   302 power supply
   304 sensing unit
   308 receiving unit
   306 electric circuit

The invention claimed is:

1. A light emitting system, comprising:
one or more light emitting diodes;
a socket adapter for retrofitting a fluorescent lamp, with base prongs configured to be connected to a fluorescent lamp driver for receiving electrical power supplied from the fluorescent lamp driver and for providing the electrical power to the one or more light emitting diodes; and
an electric circuit for emulating the presence of a fluorescent lamp to the fluorescent lamp driver by emulating at least one of a fluorescent lamp filament resistance and a fluorescent lamp impedance to the fluorescent lamp driver in a frequency range unused by the fluorescent lamp driver to drive a fluorescent lamp in fluorescent lamp operation procedures.

2. The system of claim 1, wherein the electric circuit is further configured to draw a nominal electrical power from the fluorescent lamp driver via the base prongs at a fluorescent lamp starting process, the nominal electrical power being sufficient to power the one or more light emitting diodes for light emission.

3. The system of claim 1, wherein the electric circuit is configured to detect at least one of the fluorescent lamp driver status, and a fluorescent lamp driver type from at least one of a frequency, amplitude, and power sequence of a fluorescent lamp driving current supplied by the fluorescent lamp driver to the light emitting system via the base prongs.

4. The system of claim 1, wherein the electric circuit is configured to perform the emulation for signaling the fluorescent lamp driver a required predetermined electrical power requirement for driving the one or more light emitting diodes of the light emitting system to emit light.

5. The system of claim 4, further comprising at least one sensor for detecting one or more light emitting system characteristics, said one or more light emitting system characteristics including at least one of: one or more actual light emission characteristics of the light emitting system, a temperature of the light emitting system, one or more environmental conditions of the environment in which the light emitting system is being operated, and the age of the light emitting system, wherein the signaled electrical power requirement depends on said detected one or more light emitting system characteristics.

6. The system of claim 1, wherein the electric circuit is configured for sending a signal to the fluorescent lamp driver indicating an electrical power requirement for driving the one or more light emitting diodes.

7. The system of claim 6, further comprising at least one sensor for detecting one or more light emitting system characteristics, said one or more light emitting system characteristics including at least one of: one or more actual light emission characteristics of the light emitting system, a temperature of the light emitting system, one or more environmental conditions of the environment in which the light emitting system is being operated, and the age of the light emitting system, wherein the sent electrical power requirement depends on said detected one or more light emitting system characteristics.

8. The system of claim 6, wherein the signal indicating the electrical power requirement is a digital signal.

9. The system if claim 1, further comprising at least one sensor for receiving remote control signals.

10. The system of claim 9, wherein the electrical circuit comprises a resonant circuit which is resonant at a particular frequency in the frequency range unused by the fluorescent lamp driver to drive a fluorescent lamp, wherein the light emitting device emulates at the particular frequency an impedance value among a plurality of impedance values stored in a table in a memory device of the fluorescent lamp driver, each of the plurality of impedance values being associated in the table with a corresponding electrical power scheme for driving the light emitting system.

11. A fluorescent lamp driver, the lamp driver being configured to power a fluorescent lamp when the fluorescent lamp driver is connected to the fluorescent lamp, and to power the light emitting system of claim 1 including the one or more light emitting diodes via the base prongs when the fluorescent lamp driver is connected to the light emitting system of claim 1, wherein the fluorescent lamp driver is further configured for detecting at least one electrical power requirement for the light emitting system based on at least one of the resistance and an impedance response of the light emitting system in the frequency range unused by the fluorescent lamp driver to drive the fluorescent lamp in fluorescent lamp operation procedures.

12. The fluorescent lamp driver of claim 11, further comprising a memory device storing therein a table having a plurality of impedance values and a plurality of corresponding electrical power schemes for the fluorescent lamp driver to employ to drive the one or more light emitting diodes of the light emitting system.

13. The fluorescent lamp driver of claim 11, wherein the fluorescent lamp driver is configured to select a level of at least one of a current and a voltage supplied by the fluorescent lamp driver to the light emitting system via the base prongs for driving the one or more light emitting diodes of the light emitting system depending on the emulated at least one of a fluorescent lamp filament resistance and a fluorescent lamp impedance in the frequency range unused by the fluorescent lamp driver to drive the fluorescent lamp in fluorescent lamp operation procedures.

14. The system of claim 1, wherein the one or more light emitting diodes comprise a plurality of subsets of light emitting diodes, and wherein each subset of light emitting diodes has a corresponding frequency range for selection of the subset, and wherein each subset of light emitting diodes is selected for illumination by a current which is supplied to the light emitting system via the base prongs by the fluorescent lamp driver being in a corresponding frequency range.

15. The system of claim 14, wherein all of the subsets of light emitting diodes are selected for illumination in response to the current which is supplied to the light emitting system via the base prongs by the fluorescent lamp driver having a frequency which is less than the frequency ranges for selection of the subsets of light emitting diodes.

16. The system of claim 1, wherein the electric circuit is configured to determine, in response to a frequency of a current supplied to the light emitting system via the base prongs by the fluorescent lamp driver, at least one of: a preheating procedure and a starting procedure implemented by the fluorescent lamp driver.

17. The system of claim 1, wherein the electric circuit is configured to determine, in response to a frequency of a current supplied to the light emitting system via the base prongs by the fluorescent lamp driver, all of: a driving power, a preheating procedure, and a starting procedure implemented by the fluorescent lamp driver.

18. The system of claim 1, wherein the emulated at least one of a fluorescent lamp filament resistance and a fluorescent lamp impedance in the frequency range unused by the fluorescent lamp driver to drive a fluorescent lamp in fluorescent lamp operation procedures indicates an electrical power scheme to be applied by the fluorescent lamp driver to the light emitting system for operation of the light emitting system.

19. The system of claim 18, wherein the electrical power scheme specifies a lamp starting sequence, a driving frequency, and a current waveform which is to be applied by the fluorescent lamp driver to drive the light emitting system.

20. The system of claim 1, wherein the emulated at least one of a fluorescent lamp filament resistance and a fluorescent lamp impedance in the frequency range unused by the fluorescent lamp driver to drive a fluorescent lamp in fluorescent lamp operation procedures indicates at least one electrical power requirement for driving the one or more light emitting diodes, wherein the at least one electrical power requirement includes at least one of: a voltage amplitude, a current amplitude, a frequency, and a polarity employed by the fluorescent lamp driver for driving the light emitting system.

* * * * *